(12) United States Patent
Korhonen et al.

(10) Patent No.: US 11,398,345 B2
(45) Date of Patent: Jul. 26, 2022

(54) METHOD FOR MANUFACTURING A MAGNETIC CORE OF AN ELECTRIC MACHINE

(71) Applicant: KONE CORPORATION, Helsinki (FI)

(72) Inventors: Tuukka Korhonen, Helsinki (FI); Tero Hakala, Helsinki (FI); Tero Purosto, Helsinki (FI); Jouni Ratia, Helsinki (FI)

(73) Assignee: KONE Corporation, Helsinki (FI)

( * ) Notice: Subject to any disclaimer, the term of this patent is extended or adjusted under 35 U.S.C. 154(b) by 75 days.

(21) Appl. No.: 16/786,221

(22) Filed: Feb. 10, 2020

(65) Prior Publication Data

US 2020/0176183 A1 Jun. 4, 2020

Related U.S. Application Data

(63) Continuation of application No. PCT/EP2018/074261, filed on Sep. 10, 2018.

(30) Foreign Application Priority Data

Sep. 11, 2017 (EP) .................................... 17190378

(51) Int. Cl.
    *H02K 15/00* (2006.01)
    *H01F 41/02* (2006.01)
    *H02K 1/14* (2006.01)
    *H02K 15/02* (2006.01)

(52) U.S. Cl.
    CPC ............. *H01F 41/02* (2013.01); *H02K 1/148* (2013.01); *H02K 15/022* (2013.01); *Y10T 29/49009* (2015.01)

(58) Field of Classification Search
    CPC ...... H02K 1/16; H02K 1/2793; H02K 1/2766; H02K 1/12; H02K 1/265; H02K 21/026; B66B 1/28; F16C 35/067; Y10T 29/49009; H01F 27/28
    USPC .... 29/596, 419.2, 426.5, 598, 605, 606, 609
See application file for complete search history.

(56) References Cited

U.S. PATENT DOCUMENTS

| | | | |
|---|---|---|---|
| 7,845,065 B2 * | 12/2010 | Holmes | H02K 1/02 29/596 |
| 10,574,117 B2 * | 2/2020 | Okazaki | H02K 9/19 |
| 2009/0113696 A1 | 5/2009 | Holmes | |
| 2017/0173873 A1 | 6/2017 | Huang et al. | |

FOREIGN PATENT DOCUMENTS

| | | |
|---|---|---|
| EP | 2 779 373 A2 | 9/2014 |
| EP | 3 041 113 A1 | 7/2016 |
| EP | 2 779 373 A3 | 11/2017 |
| GB | 2 149 226 A | 6/1985 |
| JP | 2002-34214 A | 1/2002 |

* cited by examiner

*Primary Examiner* — Thiem D Phan
(74) *Attorney, Agent, or Firm* — Birch, Stewart, Kolasch & Birch, LLP

(57) ABSTRACT

A method for manufacturing a magnetic core of an electric machine is presented. The method comprises defining at least one characteristic of magnetic flux for each of at least two portions of the magnetic core, determining types for each of the at least two portions of the magnetic core based on the defined at least one characteristic representing the corresponding portion of the magnetic core, and obtaining or producing the magnetic core comprising the at least two portions having the determined types.

16 Claims, 6 Drawing Sheets

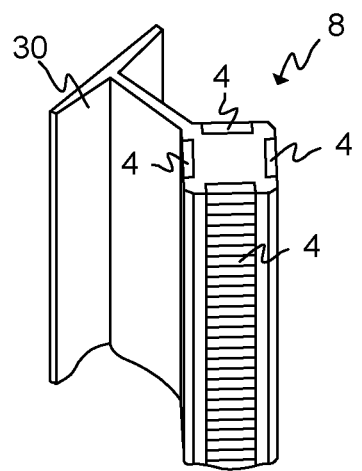
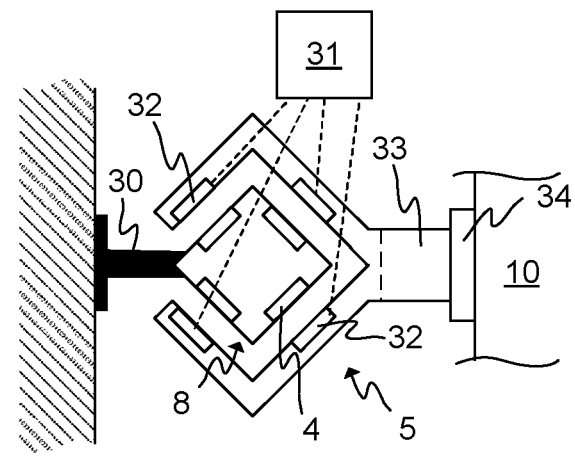
FIG. 3A       FIG. 3B
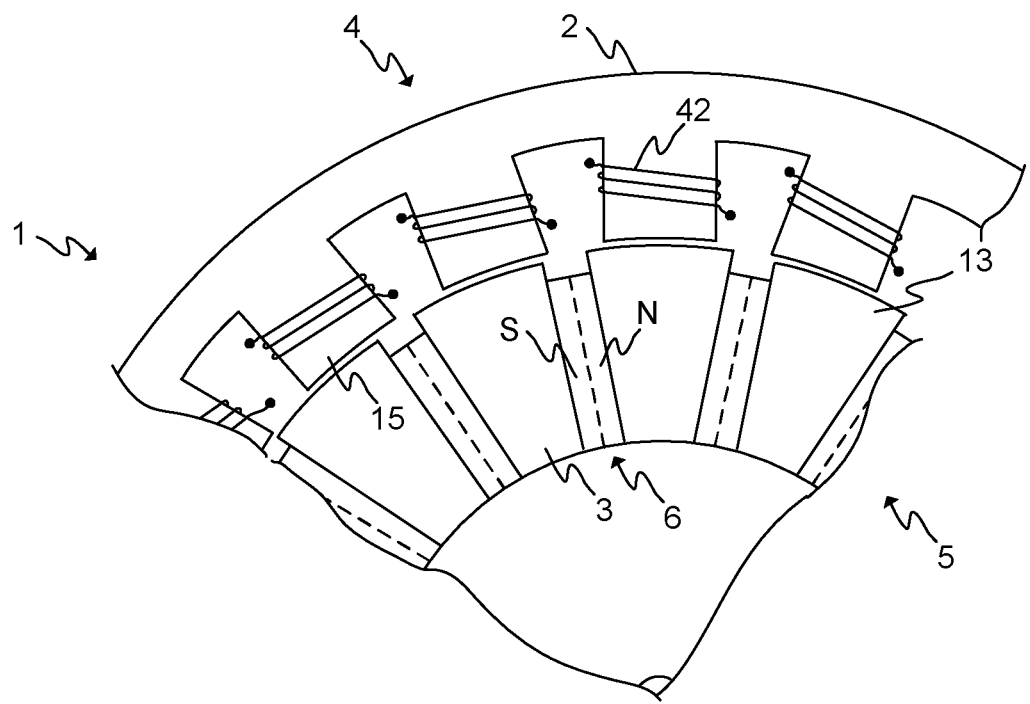
FIG. 4

METHOD FOR MANUFACTURING A MAGNETIC CORE OF AN ELECTRIC MACHINE

CROSS REFERENCE TO RELATED APPLICATIONS

This application is a Continuation of PCT International Application No. PCT/EP2018/074261, filed on Sep. 10, 2018, which claims priority under 35 U.S.C. 119(a) to Patent Application No. 17190378.4, filed in Europe on Sep. 11, 2017, all of which are hereby expressly incorporated by reference into the present application.

TECHNICAL FIELD

The invention concerns in general the technical field of electric machines, such as, transformers, motors and generators, comprising magnetic circuits. The invention concerns especially, however, not exclusively, magnetic cores utilized in the electric machines, and the manufacturing thereof, for guiding magnetic flux in a desired manner.

BACKGROUND

Typically magnetic cores of electric machines are manufactured by utilizing electrical steel laminates. The use of the laminates reduces the amount of eddy currents, and therefore losses, in the magnetic core as is well known.

The magnetic cores can be made to have different shapes and sizes. Typically, however, the magnetic cores manufactured of electrical steel laminates have a certain kind of shape because the electrical steel laminates are planar elements which are then aligned with the direction of the magnetic flux which is intended to flow in the core. If the core has complex three-dimensional (3D) shape, it can be very difficult to manufacture by using planar laminates. Furthermore, it may be desirable to arrange the laminates such that there are no gaps between two adjacent laminates in order to obtain good path for the magnetic flux.

It is, however, desirable to be able to manufacture magnetic cores for electric machines which can have complex 3D shapes and fit perfectly into the designed position where the cores are intended to be arranged in, however, without sacrificing the quality of the product, for example, related to guiding of the magnetic flux and the amount of eddy currents. Thus, there is still a need to develop methods for manufacturing magnetic circuits for electric machines.

SUMMARY

An objective of the present invention is to provide a method for manufacturing a magnetic core of an electric machine, an electric machine utilizing the magnetic core thereof, and a magnetic core. Another objective of the present invention is that by the method magnetic cores with optimized core portions can be manufactured.

The objectives of the invention are reached by a method, a magnetic core and an electric machine as defined by the respective independent claims.

According to a first aspect, a method for manufacturing a magnetic core of an electric machine, such as, for an electric motor, generator, inductor or a transformer, is provided. The method comprises defining at least one characteristic of magnetic flux for each of at least two portions of the magnetic core, wherein the at least one characteristic represents a property of the magnetic flux, such as related to its amplitude and/or direction and/or varying thereof as a function of time, during an intended use of the magnetic core, determining a type of each of the at least two portions of the magnetic core based on the defined at least one characteristic representing the corresponding portion of the magnetic core, and obtaining or producing the magnetic core comprising the at least two portions having the determined types.

The intended use of the magnetic core refers herein to conditions during which the magnetic core is designed to be in use. This may, for example, mean the magnetic core to be in use when arranged as a part of an electric machine operating in its nominal operating conditions or when operating at a limiting condition, such as, at maximum power, current or voltage, which, on the other hand, may entail, for example, the presence of a certain level of magnetic flux density in the magnetic core when in its intended use. The limiting condition may be more severe condition for the electric machine than the nominal condition, that is, a maximum or minimum value to be used in designing of the core. Thus, the characteristic of magnetic flux during the intended use of the magnetic core depends on which conditions the magnetic core, or part of it, is designed or intended to be arranged during its use.

The at least one characteristic of magnetic flux may be a magnitude of magnetic flux in the corresponding portion of the magnetic core. Alternatively or in addition, the at least one characteristic of magnetic flux may be a variation of magnitude, and/or direction, of magnetic flux in the corresponding portion of the magnetic core.

The types of the at least two portions of the magnetic core may comprise laminate type. Alternatively or in addition, the types of the at least two portions of the magnetic core may comprise type having filaments, or filament-type of elements or "bars", of substantially rectangular or square shape cross-sectional area. Alternatively or in addition, the types of the at least two portions of the magnetic core may comprise solid type. The filaments may not necessarily be straight but may experience curved shapes as well.

The method may comprise arranging the at least two portions of the magnetic core depending on a direction of magnetic flux. This may, preferably, entail optimizing the structure based on the direction of the magnetic flux for minimizing eddy currents. The at least two portions of the magnetic core may be arranged, for example, so that the filaments of the portion of the magnetic core are arranged in the direction of the magnetic flux.

The obtaining or producing may comprise producing the at least two portions to have the corresponding type by casting.

The obtaining or producing may comprises producing the at least two portions to have the corresponding types by an additive manufacturing method. The additive manufacturing method may be selective laser melting or sintering, or powder-bed or powder fed method.

The method may comprise integrating the at least two portions of the magnetic core. The integrating may comprise welding the obtained or produced portions of the magnetic core to each other.

The obtaining or producing and the integrating may be performed substantially simultaneously by an additive manufacturing method, such as, selective laser melting or sintering, or powder-bed or powder fed method.

The magnetic core may comprise an air gap between two magnetic teeth. The method may comprise producing the magnetic teeth so that ends of the teeth residing at the air gap have smaller cross-sectional area relative to cross-sectional area of the teeth at other positions for focusing the magnetic flux at the air gap.

According to a second aspect, a magnetic core of an electric machine is provided. The magnetic core comprises at least two portions, wherein the at least two portions are different types of portions depending on a characteristic of magnetic flux in the corresponding portion, wherein the characteristic represents a property of the magnetic flux during an intended use of the magnetic core.

The at least two portions may be produced by an additive manufacturing method as a single piece core part, or even as complete magnetic core.

According to a third aspect, an electric motor comprising a rotor and a stator arranged to be in electromagnetic engagement with each other is provided. A magnetic core of at least one of the rotor and stator is manufactured by the method according to the first aspect or embodiments thereof.

According to a fourth aspect, an elevator comprising at least one elevator car configured to be moved by an electric motor is provided, wherein the electric motor is an electric motor according to the third aspect.

The present invention provides a method for manufacturing a magnetic core for an electric machine. The method provides advantages over known solutions such that the magnetic core comprises several different portions which are better optimized for the magnetic flux which is designed to be flown in the magnetic core and different portions thereof.

Various other advantages will become clear to a skilled person based on the following detailed description.

The expression "a plurality of" refers herein to any positive integer starting from two, e.g. to two, three, or four.

The terms "first", "second", "third" and "fourth" do not denote any order, quantity, or importance, but rather are used to distinguish one element from another.

The exemplary embodiments of the present invention presented herein are not to be interpreted to pose limitations to the applicability of the appended claims. The verb "to comprise" is used herein as an open limitation that does not exclude the existence of also un-recited features. The features recited in depending claims are mutually freely combinable unless otherwise explicitly stated.

The novel features which are considered as characteristic of the present invention are set forth in particular in the appended claims. The present invention itself, however, both as to its construction and its method of operation, together with additional objectives and advantages thereof, will be best understood from the following description of specific embodiments when read in connection with the accompanying drawings.

BRIEF DESCRIPTION OF FIGURES

The embodiments of the present invention are illustrated by way of example and not by way of limitation in the figures of the accompanying drawings.

FIG. 2 illustrates schematically an elevator in which the magnetic core according to an embodiment of the present invention may be utilized in.

FIGS. 3A-3B illustrate schematically electric linear motors, or at least parts thereof, according to some embodiments of the present invention.

FIG. 4 illustrates schematically magnetic cores of an electric motor according to an embodiment of the present invention.

DESCRIPTION OF SOME EMBODIMENTS

Figure 1:
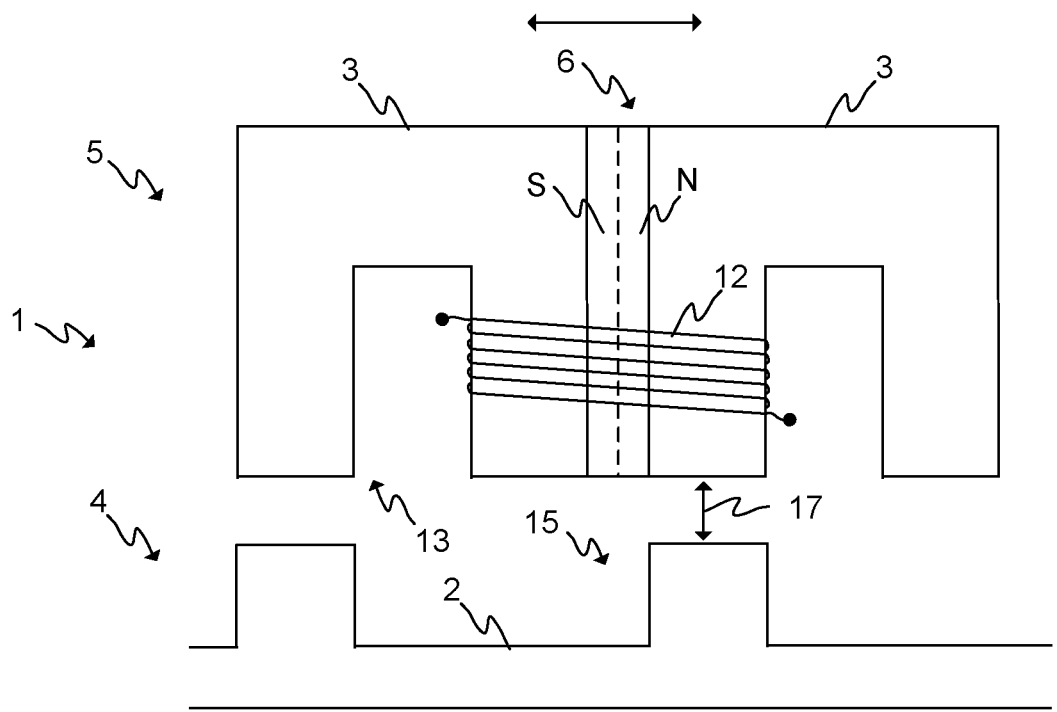
FIG. 1 illustrates schematically magnetic cores of an electric linear motor according to an embodiment of the present invention.

FIG. 1 illustrates three magnetic cores 2, 3 of an electric linear motor 1 according to an embodiment of the present invention. Two magnetic cores 3 of the rotor 5, or a part of the rotor 5 or "mover" 5, are illustrated above and the magnetic core 2 of the stator 4 below in FIG. 1. There is also a permanent magnet 6 arranged between two magnetic cores 3 of the rotor 5. The south S and north N poles of the magnet 6 are illustrated in FIG. 1, however, they could also be arranged in the opposite way. The rotor 5 preferably comprises a winding 12 or several windings 12 for injection of current to produce magnetic field establishing the electromagnetic engagement between the stator 4 and the rotor 5. There are, preferably, magnetic teeth 13 arranged to the rotor 5 and being part of the magnetic cores 3. The stator 4 preferably also comprises magnetic teeth 15. The magnetic teeth 13, 15 are connected to each other by the yokes of the rotor 5 and stator 4, respectively. There is also illustrated an air gap 17 of the magnetic circuit of the motor 1. In motors 1, the magnetic cores 2, 3 must be separated by one or several air gaps 17 in order to enable the relative movement between stator 4 and rotor 5. In transformers and inductors, for example, the air gap 17, if any, may be such that magnetic cores of the primary and secondary sides are not movable with respect to each other. The horizontal two-headed arrow in FIG. 1 illustrates the movement of the mover 5 with respect to the stator 4.

Figure 2:
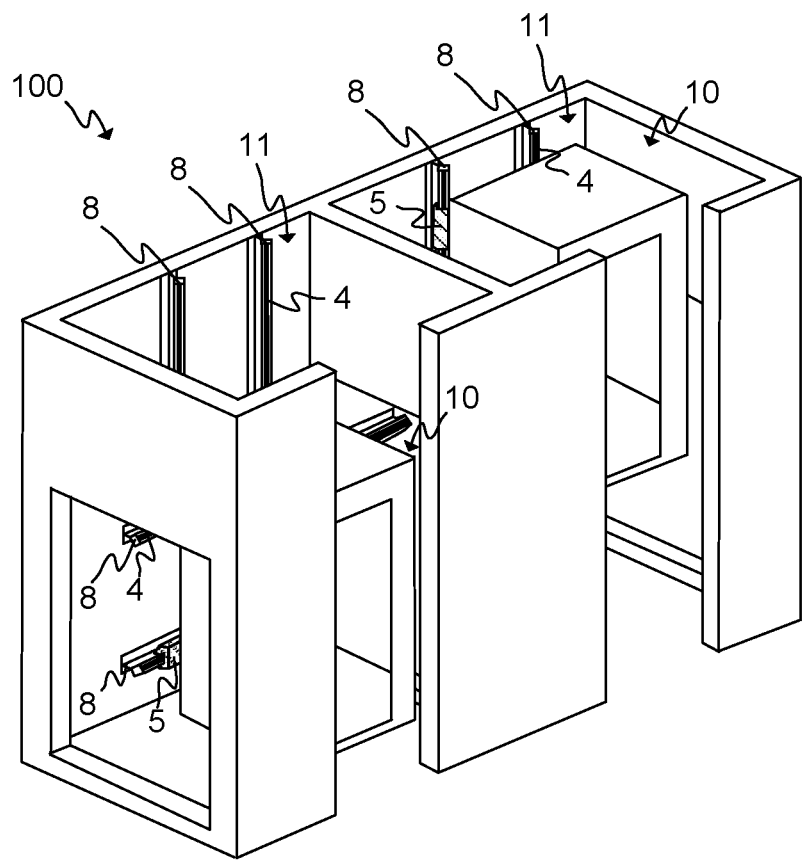

The electric linear motor 1 according to an embodiment of the present invention may be utilized, for example, in an elevator 100 for moving the elevator car 10 as illustrated in FIG. 2. FIG. 2 illustrates schematically a part of an elevator 100 according to an embodiment of the present invention. There are two elevator cars 10 configured to be moved in the elevator shaft 11 by the electric linear motor 1. The electric linear motor 1 comprises a stator 4 or stators 4 comprised in a stator beam 8 or beams 8, in this case two stator beams 8. A stator beam 8 may be arranged vertically or horizontally, that is, the elevator 100 of FIG. 2 comprises vertical stator beam 8 or beams 8 and/or horizontal stator beam 8 or beams 8. However, the stator beam 8 or beams 8 may also be arranged to any direction(s) in which the elevator car 10 is desired to be moved. One stator beam 8 may, preferably, be comprised of a plurality of stator beam parts arranged one after another to yield the desired length for the stator beam 8 in whole.

The electric linear motor 1 further comprises a mover 5 or movers 5, or a rotor 5 or rotors 5, arranged or coupled to the elevator car 10 or cars 10. The mover 5 or movers 5 are arranged to be in electromagnetic engagement with the stator 4 or stators 4 comprised in the stator beam 8 along which the mover 5 is configured to be moved, thus enabling the movement of the elevator car 10 with which the mover 5 has been mechanically coupled with.

In FIG. 2, the stator beams 8 are arranged to the back wall of the elevator shaft 11. It should be noted, however, that the elevator shaft 11 refers herein to the elevator car pathway 11 which, as described above, may include vertical parts, horizontal parts, and/or parts having a third direction different with respect to vertical and horizontal directions. For example, the part of the elevator shaft 11 depicted in FIG. 2 essentially comprises two vertical parts and one horizontal part. In FIG. 2, the elevator shaft 11 or the elevator car pathway 11 further comprises a front wall and side walls. The front wall may, preferably, comprise an opening for entering into the elevator car 10 or cars 10. Although shown in FIG. 2 that the opening for entering the elevator cars 10 is arranged only at vertical parts of the elevator shaft 11, the opening may as well be arranged to the horizontal part or any part of the elevator shaft 11. It should be noted, however, that the elevator shaft 10 may in some cases comprise only one wall or a structure arranged to accommodate the necessary equipment such as the stator beam 8. Thus, the elevator shaft 11 or the elevator car pathway 11 does not necessarily have to define a substantially closed volume, that is, surrounded by wall elements or glass or any other structures as long as there is at least a support structure to support the stator beam(s) 8.

As illustrated in FIG. 2, and also understandable to a person skilled in the art, the stator beam(s) 8, and therefore stator(s) 4, may be very long, for example, from tens of meters to hundreds of meters. This means that is beneficial to have as light stator(s) 4 as possible in order to be able to couple them to support structure and so that the stator 4 can withstand its own weight.

FIG. 3A illustrates schematically a part of the stator beam 8, or a stator beam part 8, according to an embodiment of the present invention by a perspective view. The part of the stator beam 8 comprises at least one stator 4, in this case four, extending substantially along the whole stator beam 8, which may, however, be made of several stator beam parts.

There may, advantageously, be four stators 4 arranged at all four sides of the stator beam 8. There may also be a fastening portion 30 or portions 30 by which said part 8 may be attached in fixed manner to the structures, such as a wall, of the elevator shaft 11. The fastening portion 30 may also be a separate fastening portion which may then be attached to the stator beam 8 for arranging the stator beam 8 into the elevator shaft 11 or may be an integrated part of the stator beam 8 or a part thereof.

FIG. 3B illustrates schematically an electric linear motor 1, or at least a part thereof, according to an embodiment of the present invention. The electric linear motor 1 comprises a mover 5 or a rotor 5, preferably, a C-shaped or U-shaped mover 5. The mover 5 comprises at least one unit of electromagnetic components 32 comprising at least one of winding 12 and, optionally, preferably, permanent magnet(s) 6 and magnetic core(s) 3 or ferromagnetic material. The unit or units of electromagnetic components 32 may, preferably, be comprised in the mover 5 and adapted to face the stator 4 or stators 4 of the stator beam 8, as shown in FIG. 3B, for instance. The units of electromagnetic components 32 are preferably arranged to be in electromagnetic engagement with the stators 4 for moving the mover 5 along the stator beam 8. There may also be a support portion 33 by which the mover 5 may be attached in fixed manner to the elevator car 10, for example, to the back wall of the car 10. As can be seen, the mover 5 may be shaped and designed in such a way as to enable the movement of the mover 5 along the stator beam 8 without interference from the fastening or support portions 30, 33. There may, furthermore, be further support portions 34 utilized to attach the mover 5 to the elevator car 10.

The movement of the mover 5 along the stator beam 8 may be implemented by known control methods, such as, field-oriented or vector control or the like.

The basic idea is to produce an alternating magnetic field, for example by an electrical drive 31, by injecting current to a unit of electromagnetic components 32 of the mover 5, such as to a winding 12 or coil 12 thereof. The unit of electromagnetic components 32 facing the stator 4 then co-acts with the stator 4 through the electromagnetic engagement and produces a force which moves the mover 5 or the rotor 5 and, thus, the elevator car 10 along the stator beam 8.

FIG. 4 illustrates an electric motor 1 according to an embodiment of the present invention. The motor 1 is a typical motor 1 having a rotating rotor 5 and a stator 4 arranged around the rotor 5. The windings 42 are arranged to the stator 4, for example, to the magnetic teeth 15 comprised in core 2 the stator 4. In this case, there are no windings in the rotor 5. There are, however, permanent magnets 6 arranged to the rotor 5 for producing magnetic poles for establishing the electromagnetic engagement with the stator 4. The basic idea is to produce an alternating, that is "rotating", magnetic field, for example, by an electrical drive 31 or a connection to an electrical grid, by injecting current to windings 42, for example, three-phase windings 42, of the stator 4.

Although only the electric linear motor 1, especially for an elevator 100, and the rotating electric motor 1 are presented herein explicitly, it is to be understood that magnetic cores according to various embodiments of the present invention may be utilized in various other electric machines utilizing magnetic circuits, such as including motors, generators, transformers, etc. Furthermore, the rotating electric motors 1 may be radial or axial flux motors. Still further, the motors 1 may be inner or outer rotor electric machines. Furthermore, although presented in connection with FIGS. 1 and 4 that there are permanent magnets 6 arranged into the motors 1, the magnetic cores 2, 3 according to various embodiments are also utilizable in magnetic circuits not having permanent magnets 6. This entails utilizing the magnetic cores 2, 3 also in non-permanent magnet motors 1, for instance.

Figure 5A:
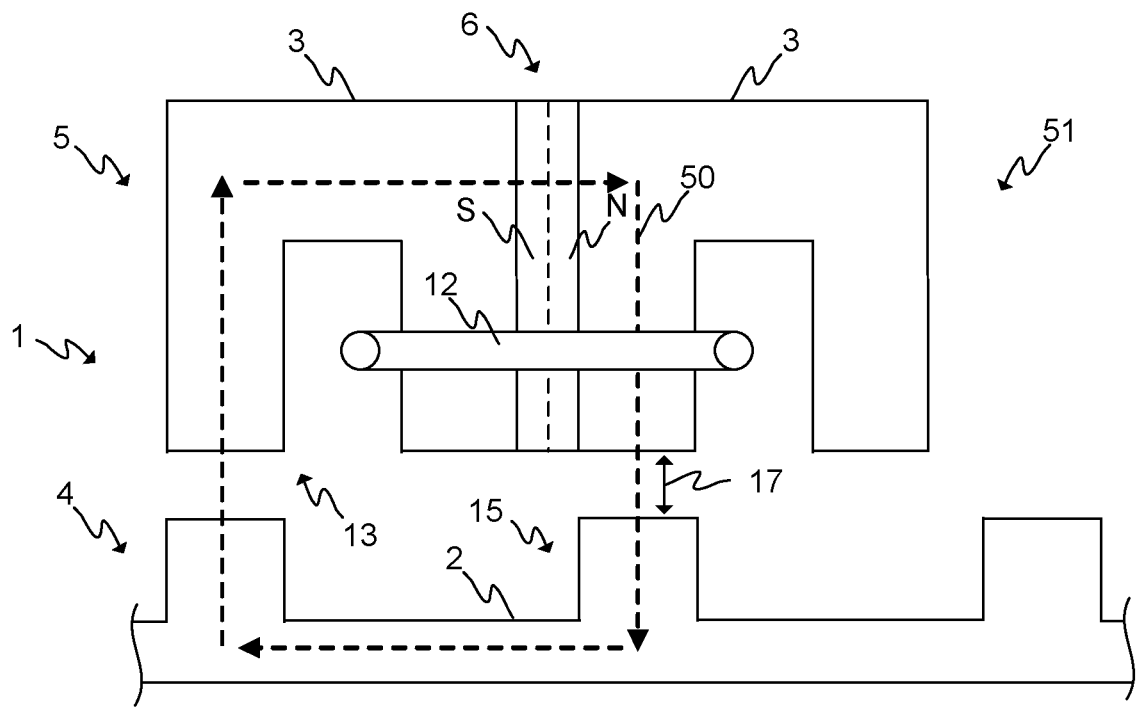
FIGS. 5A-5B illustrate schematically an electric linear motor, or at least parts thereof, according to an embodiment of the present invention.
Figure 5B:
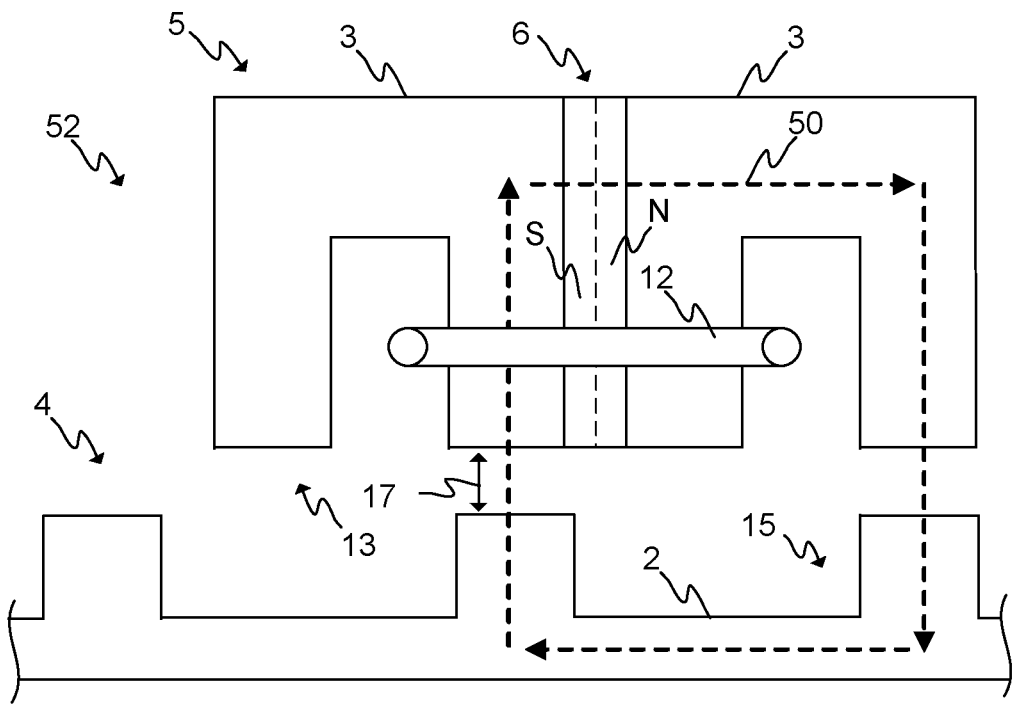

FIGS. 5A and 5B illustrate schematically a part of an electric linear motor 1 according to an embodiment of the present invention. The path of the magnetic flux 50, at least mainly, in accordance with the particular embodiment is illustrated with dashed line. As can be seen, the flux preferably flows across the air gap(s) 17 via the magnetic teeth 13, 15 of the mover 5 (or the rotor 5) and stator 4.

FIG. 5A illustrates the mover 5 in a first position 51 and FIG. 5B in a second position 52. As can be seen in FIGS. 5A and 5B, the path of the flux, at least mainly, varies depending on the position of the mover 5 with respect to the stator 4.

Figure 6:
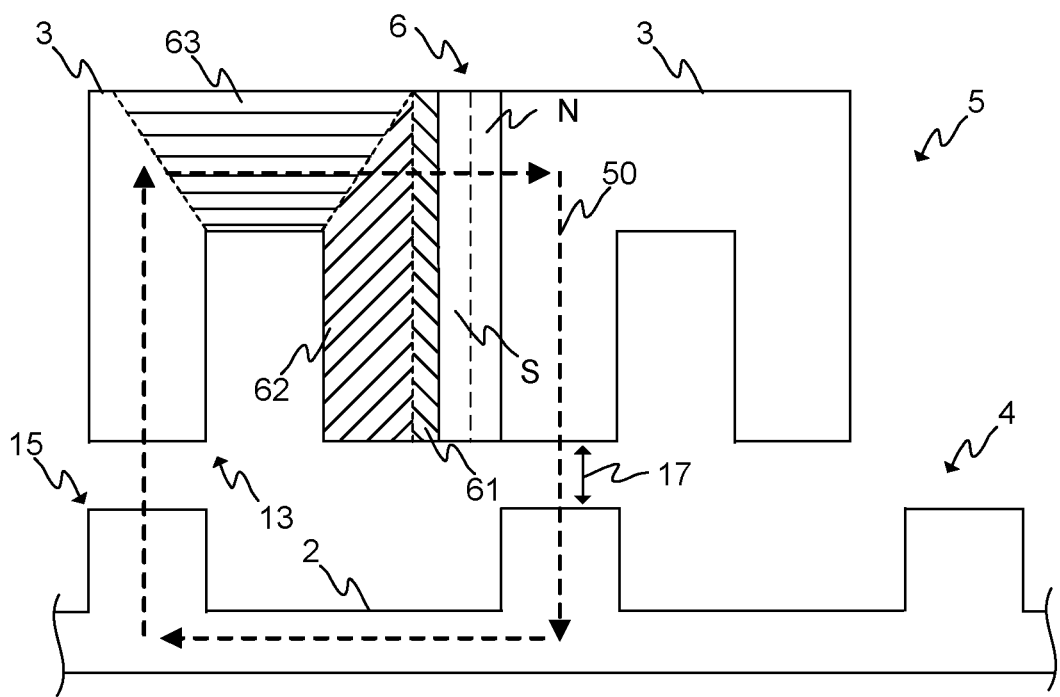
FIG. 6 illustrates schematically portions of magnetic core of an electric linear motor according to an embodiment of the present invention.

FIG. 6 illustrates schematically different portions of one of the magnetic cores 3 of the mover 5 as a cross-sectional view. The first portion 61 is closest to the permanent magnet 6. In this portion, the magnetic flux 50, the direction and magnitude, remains essentially constant due to the strong field caused by the permanent magnet 6. In this region the magnetic core 3 may be made of solid ferromagnetic material because there is essentially no risk of generating eddy currents due to static magnetic field near the permanent magnet. On the third portion 63, the yoke, flux is changing from zero to maximum, and, thus, preferably filaments of material or filament elements or parts having a square shape cross section may be utilized and arranged aligned with the direction of the magnetic flux. On the second portion 62, that is, in the teeth 13, the flux is changing from minimum to maximum via zero. The direction of the flux is also changing as it bends, in this case, about ninety degrees. Laminate-type of a shape may preferably be used for the teeth 13, 15.

Although not illustrated, the magnetic core 2 of the stator 4 may be manufactured similarly to the magnetic core 3 of rotor 5, however, as there are not permanent magnets 6, the magnetic core 2 of the stator 4 comprises only second 62 and third 63 portions, that is, basically for the teeth 15 and the yoke of the stator 4.

Figure 7A:
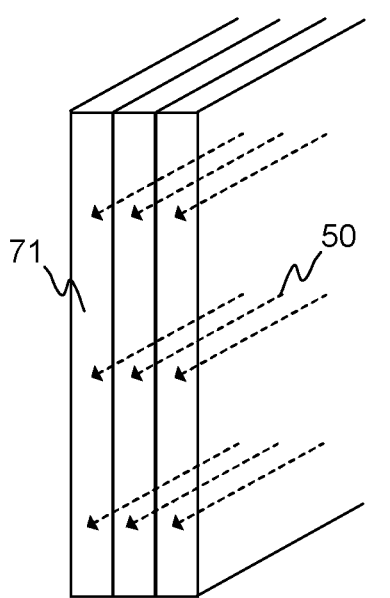
FIGS. 7A-7C illustrate schematically portions of magnetic core utilizable in various embodiments of the present invention.
Figure 7B:
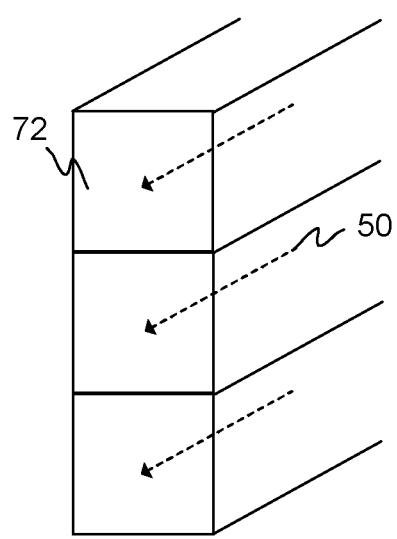

FIGS. 7A and 7B illustrate schematically portions of magnetic core 2, 3 according to two embodiments of the present invention. FIG. 7A illustrates laminate-type elements 71, such as, of electrical steel laminates. The magnetic flux 50 is essentially confined within the laminate and, thus, amount of eddy currents is decreased with respect to the case where the core is made solid or "bulk" material. FIG. 7B illustrates filaments, or filament-type of elements or "bars", of magnetic core 2, 3 elements or parts having a square cross section 72. Filament elements or parts 72 having a square cross section further reduce eddy current losses with respect to laminate-type elements 71 having the same cross sectional area due to shorter possible path for the eddy currents. Although not shown in the figures, there may also be filaments or portions of the magnetic core having a round cross section. The filaments may not necessarily be straight but may experience curved shapes as well.

Figure 7C:
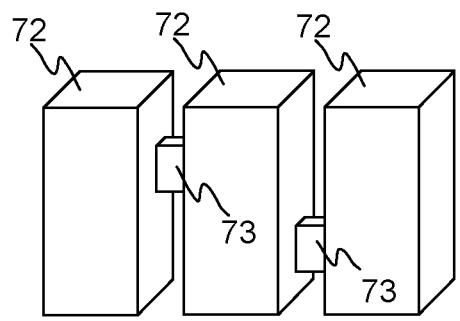

In order to ensure rigid internal structure for the magnetic cores 2, 3, laminate-type 71 or filament elements or parts 72 having a square cross section or part 72 of magnetic core 2, 3, for example, may be fixed relative to each other, for example, by joint elements 73. This is illustrated in FIG. 7C in which parts of the magnetic core 2, 3, for example, arranged into the yoke part of the core, that is, the third portion 63, are arranged between the filament elements 72 having essentially a square-shaped cross section. This way the filaments elements 72 having a square cross section may be separated from each other, thus, further reducing amount of eddy currents, for instance.

Figure 8A:
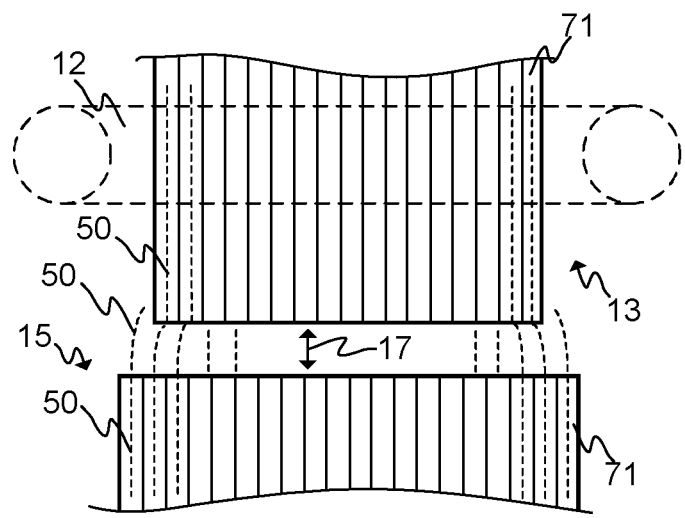
FIGS. 8A and 8B illustrate schematically magnetic teeth of a magnetic core according to an embodiment of the present invention.

FIG. 8A illustrates a magnetic core, especially magnetic teeth 13, 15 thereof, for example, of an electric linear motor 1, manufactured by using laminates as a cross-sectional view according to an embodiment of the present invention. Although the air gap 17 in the FIG. 8A is shown to be between a magnetic tooth 13 of the mover 5 and a magnetic tooth 15 of the stator 4, the air gap 17 such as shown in FIG. 8A may as well reside in any magnetic circuit, for example, in an inductor core. As can be seen, magnetic flux 50 follows the shape of the laminate and therefore bends in the air gap 17.

The shape of the ends of the magnetic teeth 13, 15 have rectangular shape due to using laminates.

Figure 8B:
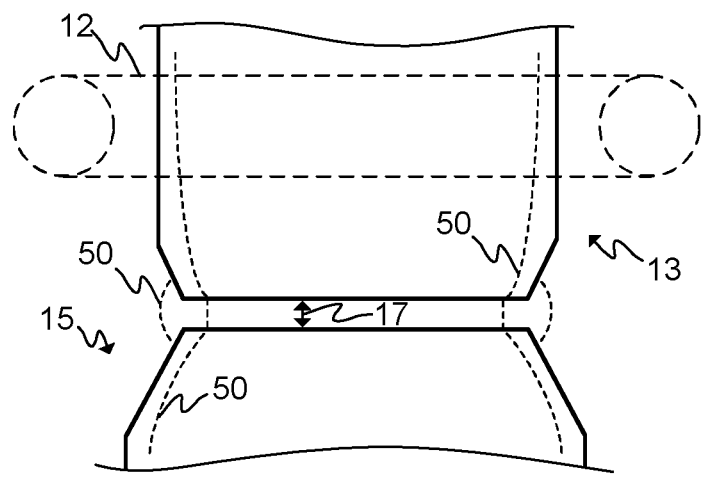

FIG. 8B illustrates a magnetic core, especially magnetic teeth 13, 15 thereof, for example, of an electric linear motor 1, according to another embodiment of the present invention. The ends of the magnetic teeth have been shaped to focus the magnetic flux with respect to the air gap 17. The teeth 13, 15 may be manufactured of solid material, for example, by casting or, preferably, by additive manufacturing methods or 3D printing, such as, selective laser sintering (SLS) or, more preferably, selective laser melting (SLM). For example, by using SLM, each portion of the core may be shaped to follow the 3D shape best suited for the corresponding portion of the magnetic core. The magnetic flux 50 tends to bend less in the laminated structure relative to structure of solid material, as in FIG. 8B, and therefore flux 50 may be focused by the structure of the teeth 13, 15 shown in FIG. 8B. The teeth 13, 15 in FIG. 8B are made to narrow towards the air gap 17 in order to focus the flux 50 into the air gap 17, thus leading to a higher flux density in the airgap 17.

According to an embodiment of the present invention, the magnetic teeth 13, 15, one or several, may be manufactured as having a laminated structure, such as, by utilizing additive manufacturing method or electrical steel laminates. The narrowing of the teeth 13, 15 with respect to the end of the teeth 13, 15 at the air gap 17 may be implemented by reducing the amount of laminates comprised in the teeth 13, 15 and, by this, making the teeth 13, 15 narrower at the end of the teeth 13, 15 at the air gap 17 with respect to the part of the teeth farther from said end of the teeth 13, 15. Alternatively or in addition, the laminates may be merged so that the magnetic flux 50 flowing, when the core is in use, in two or more laminates is directed or focused into one laminate or at least fewer number of laminates with respect to number of laminates farther away from the air gap 17 in order to make the teeth 13, 15 narrower for focusing the flux 50. According to an embodiment in which an additive manufacturing method is being utilized, the teeth 13, 15 may be manufactured to continuously narrow towards to end of the teeth 13, 15 at the air gap 17. This may also be implemented by manufacturing the teeth 13, 15 to have a laminated structure. The laminates may then be merged such that the teeth 13, 15 is continuous, meaning that there are no discontinuous points between the laminates in the direction of the longitudinal length of the teeth 13, 15. This allows the magnetic flux 50 to be effectively focused by narrowing the teeth 13, 15 towards the air gap 17.

According to an embodiment of the present invention, the magnetic core 1 may be utilized in an electric linear motor 1. In these motors, tangential force provides the thrusting force of the linear motor 1 for moving mover 5 along the stator beam 8 and it is proportional to the product of normal and tangential components of the magnetic flux density. The maximum flux density in the air gap 17 is the same as the saturation flux density of the core material. However, if assumed that in the magnetic core of FIG. 8A, the airgap flux density is close to the saturation flux density, in the core shown in 8B it is possible to achieve saturation with only a small increase of total reluctance of magnetic circuit. In the core shown in FIG. 8A, the total reluctance of magnetic circuit would increase much more compared to the core shown in FIG. 8B. Thus, with flux focusing structure shown in FIG. 8B, the area of the airgap may be made about 10-20 percent smaller with respect to the magnetic core shown in FIG. 8A.

Figure 9:
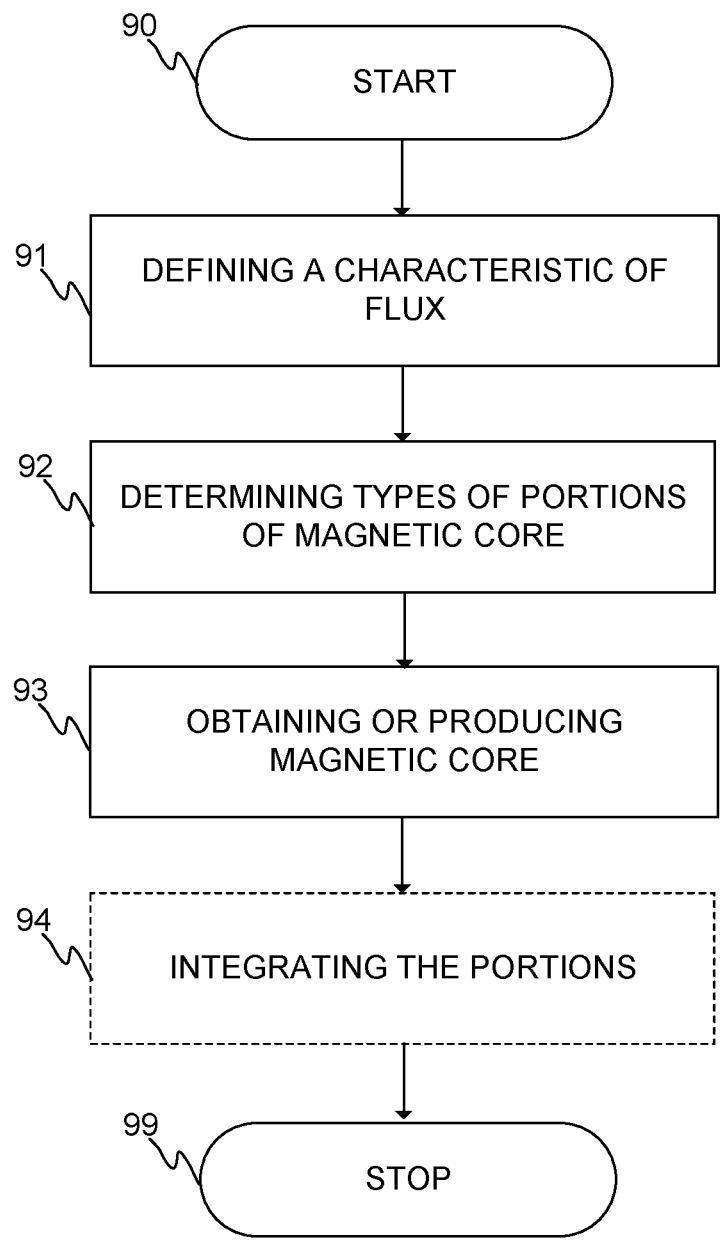
FIG. 9 illustrates a flow diagram presenting an embodiment of a method in accordance with the present invention.

FIG. 9 illustrates a flow diagram of a method for manufacturing a magnetic core according to an embodiment of the present invention.

At 90, referring to a start-up phase, the necessary tasks such as obtaining components and systems, and calibration and other configuration may take place. Specific care must be taken that the individual elements and material selections work together. Communication and electrical connections between various components and (sub-)systems may be established. At 90, specific materials may be obtained which may include different metals or metal alloys.

At 91, defining at least one characteristic of magnetic flux for each of at least two portions of the magnetic core takes place. This may entail utilizing as the least one characteristic of magnetic flux a magnitude of magnetic flux in the corresponding portion of the magnetic core. For example, the magnitude of the magnetic flux in the portion of the magnetic core designed to be high, and, thus, certain ferromagnetic materials are better suited which have high magnetic saturation. Alternatively or in addition, the variation of the magnetic flux may be utilized as the characteristic. In some portions of the magnetic core, the flux may be designed to be essentially constant while in other portions in may vary considerably. This may related to the variation of the magnitude of the magnetic flux and/or the direction of the flux.

Regarding the defining of the at least one characteristic of magnetic flux, FIG. 6 illustrates the matter. In the first portion 61, the magnetic flux remains essentially constant. In the second portion 62, the flux is changing from minimum to maximum via zero. In the third portion 63, the flux is changing from zero to maximum.

At 92, determining types for each of the at least two portions of the magnetic core based on the defined at least one characteristic representing the corresponding portion of the magnetic core takes place. For example, solid material may be used for portions in which the flux is designed to remain essentially constant. In portions, in which the magnetic flux changes rapidly, laminate type or type having square shape cross-sectional area, that is, square-shaped elements 72 or parts 72, may be used in order to reduce eddy currents. If the variation of the magnitude is relatively low, laminate type may be used rather than square-shaped parts 72. Different portions are illustrated and described in connection with FIG. 6.

At 93, obtaining or producing the at least two portions of the magnetic core having the determined types takes place. The portions may be obtained as ready-made, for example, as separated or integrated laminates or square-shaped parts or solid material parts. The portions or the parts of the portions may be casted or manufactured by an additive manufacturing method such as SLM.

The magnetic core portions may be manufactured by using cobalt-iron and silicon-iron material. However, only iron may also be used. According to an embodiment, vanadium may be incorporated into the magnetic core material, for example, using iron-vanadium (Fe—V) or iron-cobalt-vanadium (Fe—Co—V) material as the core material. The addition of vanadium reduces the saturation magnetic flux density of the material and increases resistivity of the material, thus, reducing eddy currents.

At 94, an optional step, integrating the at least two portions of the magnetic core takes place. The obtained or produced at least two portions may be welded to each other. According to an embodiment of the present invention, the at least two portions of the magnetic core may be manufactured substantially simultaneously by an additive manufacturing method, for example, SLM or SLS. This results in a single piece core part or even ready magnetic core.

This means that the magnetic core may be manufactured such that the core has different types of portions at different positions depending on the mixture, for example in case of alloys, used for the magnetic core, may vary adaptively. This means that the magnetic core is not made of single material, but different parts of the core, for example, parts in which the magnetic flux flows in certain way, are made of different material or at least having different mixture ratios of two or more elements making up the material. The magnetic core may thus be made to be anisotropic.

At 99, the method execution is ended or stopped. The method may further comprise removing excessive parts, such as support parts, which may have to remove after casting or utilizing the additive manufacturing method.

According to an embodiment of the present invention, one portion of the magnetic core may first be obtained or produced after which other portion or portions may be produced as attached to the first portion by additive manufacturing method such as SLM or SLS. Thus not all portions have to be obtained or produced simultaneously and then integrated to each other, but some portions may be "grown" on other portions. Growing refers herein, for example, manufacturing new core portions using additive manufacturing methods on core portions manufacture in a prior phase, such as, by rolling or casting or even by utilizing a similar or different additive manufacturing method.

According to an embodiment of the present invention, the magnetic core comprises an air gap 17 between two magnetic teeth 13, 15. The manufacturing method may thus comprise producing the magnetic teeth 13, 15 so that ends of the teeth 13, 15 residing at the air gap 17 have smaller cross-sectional area relative to cross-sectional area of the teeth 13, 15 at other positions for focusing the magnetic flux at the air gap 17.

According to an embodiment, the magnetic core may be manufactured such that the mixture, for example in case of alloys, used for the magnetic core, may vary adaptively in different portions of the magnetic core. This means that the magnetic core is not made of single material, but different parts of the core, for example, parts in which the magnetic flux flows in certain way, are made of different material or at least having different mixture ratios of two or more elements making up the material. The magnetic core may thus be made to be anisotropic.

According to an embodiment, the magnetic core may be manufactured of iron or iron-cobalt material by sintering. The sintering may, preferably, be laser sintering, such as, by selective laser sintering.

According to an embodiment, a surface of the magnetic core made of iron, which is hard and rigid and has good ductility under tensile stress before rupturing, may be utilized as a braking surface of the motor.

By utilizing additive manufacturing technology according to some embodiments of the present invention enables the manufacturing of narrow stator beam 8 in case of a linear electric motor 1 due to the fact that the magnetic core 2 may be made smaller or narrower by optimizing the core 2 as described herein with respect to various embodiments of the present invention.

According to an embodiment, the magnetic core may be manufactured to comprise parts which are, for example, laminate-like, planar, solid homogenous material, or cylinder, and/or, furthermore, the may exhibit 3D shapes such as curves for guiding the magnetic flux in optimal way.

The specific examples provided in the description given above should not be construed as limiting the applicability and/or the interpretation of the appended claims. Lists and groups of examples provided in the description given above are not exhaustive unless otherwise explicitly stated.

The invention claimed is:

1. A method for manufacturing a magnetic core of an electric machine, comprising:
   identifying at least two portions of the magnetic core, where at least one characteristic of magnetic flux for each of at least two portions is different, wherein the at least one characteristic represents a property of the magnetic flux during an intended use of the magnetic core, selecting a different structural type for each of the at least two portions of the magnetic core based on the difference in the at least one characteristic for a corresponding portion of the identified at least two portions of the magnetic core, and obtaining or producing each of the at least two portions having the corresponding determined type and producing the magnetic core with the at least two portions.

2. The method according to claim 1, wherein the at least one characteristic of magnetic flux is a magnitude of magnetic flux in the corresponding portion of the magnetic core.

3. The method according to claim 2, wherein the at least one characteristic of magnetic flux is a variation of magnitude of magnetic flux in the corresponding portion of the magnetic core.

4. The method according to claim 2, comprising arranging the at least two portions of the magnetic core depending on a direction of magnetic flux.

5. The method according to claim 1, wherein the at least one characteristic of magnetic flux is a variation of magnitude of magnetic flux in the corresponding portion of the magnetic core.

6. The method according to claim 1, further comprising arranging the at least two portions of the magnetic core depending on a direction of magnetic flux.

7. The method according to claim 1, wherein the different structural type selected for each of the at least two portions of the magnetic core are selected from the group comprising a laminate type element, a filament element having substantially a square shape cross-sectional area, and a solid type element.

8. The method according to claim 1, wherein the obtaining or producing comprises producing the at least two portions to have the corresponding types by casting.

9. The method according to claim 1, wherein the obtaining or producing comprises producing the at least two portions to have the corresponding types by an additive manufacturing method.

10. The method according to claim 1, wherein the additive manufacturing method is selective laser melting or sintering.

11. The method according to claim 1, further comprising integrating the at least two portions of the magnetic core.

12. The method according to claim 11, wherein the integrating comprises welding the obtained or produced portions of the magnetic core to each other.

13. The method according to claim 1, wherein the obtaining or producing and the integrating are performed substantially simultaneously by an additive manufacturing method.

14. The method according to claim 1, wherein the magnetic core comprises an air gap between two magnetic teeth, wherein the method comprises producing the magnetic teeth so that ends of the teeth residing at the air gap have smaller cross-sectional area relative to cross-sectional area of the teeth at other positions for focusing the magnetic flux in the air gap.

15. An electric motor comprising a rotor and a stator arranged to be in electromagnetic engagement with each other, wherein, a magnetic core of at least one of the rotor and stator is manufactured by the method according to claim 1.

16. An elevator comprising at least one elevator car configured to be moved by an electric motor, wherein, the electric motor is an electric motor according to claim 15.

* * * * *